(12) United States Patent
Wang et al.

(10) Patent No.: US 12,512,759 B2
(45) Date of Patent: Dec. 30, 2025

(54) CONTROLLER OF BUCK-BOOST CONVERSION CIRCUIT AND MODE SWITCHING METHOD THEREOF

(71) Applicant: uPI Semiconductor Corp., Hsinchu County (TW)

(72) Inventors: Yen Hui Wang, Hsinchu County (TW); Yi-Xian Jan, Hsinchu County (TW); Chien Hsien Tsai, Hsinchu County (TW); Kuo-Jen Kuo, Hsinchu County (TW); Chao-Chung Huang, Hsinchu County (TW); Cheng-Hsing Li, Hsinchu County (TW)

(73) Assignee: uPI Semiconductor Corp., Hsinchu County (TW)

( * ) Notice: Subject to any disclaimer, the term of this patent is extended or adjusted under 35 U.S.C. 154(b) by 193 days.

(21) Appl. No.: 18/393,734

(22) Filed: Dec. 22, 2023

(65) Prior Publication Data

US 2024/0243664 A1 Jul. 18, 2024

(30) Foreign Application Priority Data

Jan. 13, 2023 (CN) .......................... 202310065376.X

(51) Int. Cl.
*H02M 3/158* (2006.01)
*H02M 1/00* (2006.01)
(52) U.S. Cl.
CPC ....... *H02M 3/1582* (2013.01); *H02M 1/0009* (2021.05)

(58) Field of Classification Search
CPC ......... H02M 3/33538; H02M 3/33546; H02M 3/33515; H02M 3/33576; H02M 3/33553;
(Continued)

(56) References Cited

U.S. PATENT DOCUMENTS 6,366,070 B1 4/2002 Cooke et al.
7,944,191 B2 5/2011 Xu
(Continued)

FOREIGN PATENT DOCUMENTS

CN 102347689 8/2015

*Primary Examiner* — Bryan R Perez
(74) *Attorney, Agent, or Firm* — JCIPRNET

(57) ABSTRACT

A controller of a buck-boost conversion circuit and a mode switching method thereof are provided. The controller control operations of multiple switches of the buck-boost conversion circuit to convert an input voltage into an output voltage and provide an output current. The controller includes a slope compensation circuit, a control loop, and a mode switching circuit. The slope compensation circuit generates a slope compensation signal according to a mode switching signal of a current cycle. The control loop is coupled to the slope compensation circuit and the switches respectively, and is configured to generate multiple switch control signals according to the slope compensation signal, a feedback voltage related to the output voltage, and a current sense signal related to the output current to control the operations of the switches respectively. The mode switching circuit is coupled to the slope compensation circuit and the control loop. The mode switching circuit generates the mode switching signal of a next cycle according to the slope compensation signal and at least one of the switch control signals to control an operation mode of the buck-boost conversion circuit.

12 Claims, 6 Drawing Sheets

(58) Field of Classification Search
CPC ......... H02M 3/33507; H02M 3/33592; H02M 3/33523; H02M 3/3353; H02M 3/33569; H02M 3/156; H02M 3/158; H02M 3/1588; H02M 3/155; H02M 3/1582; H02M 3/157; H02M 3/1563; H02M 3/1584; H02M 1/32; H02M 1/081–084; H02M 1/0006; H04B 2215/069
See application file for complete search history.

(56) References Cited

U.S. PATENT DOCUMENTS

| | | |
|---|---|---|
| 8,912,779 B2 | 12/2014 | Ren et al. |
| 9,035,640 B2 | 5/2015 | Deng |
| 9,041,363 B2 | 5/2015 | Tanabe |
| 9,602,004 B2 | 3/2017 | Deng |
| 10,075,075 B2 | 9/2018 | Zhang |
| 10,637,357 B1 | 4/2020 | Zhan et al. |
| 11,303,212 B2 | 4/2022 | Chen et al. |
| 2020/0076306 A1* | 3/2020 | Pullen .................... H02M 1/08 |

* cited by examiner

| INPUT | | Current State | | | Next Output | |
|---|---|---|---|---|---|---|
| X | Y | State | Q1 | Q0 | Mode | Cycle |
| 0 | 0 | S0 buck | 0 | 0 | 1 | boost → R_C2 |
| 0 | 0 | S1 bb-boost | 0 | 1 | 0 | buck → R_C3 |
| 0 | 0 | S2 bb-buck | 1 | 0 | 1 | boost |
| 0 | 0 | S3 boost | 1 | 1 | 1 | boost |
| 0 | 1 | S0 buck | 0 | 0 | 1 | boost |
| 0 | 1 | S1 bb-boost | 0 | 1 | 0 | buck |
| 0 | 1 | S2 bb-buck | 1 | 0 | 1 | boost → R_C7 |
| 0 | 1 | S3 boost | 1 | 1 | 1 | boost → R_C8 |
| 1 | 0 | S0 buck | 0 | 0 | 0 | buck → R_C1 |
| 1 | 0 | S1 bb-boost | 0 | 1 | 0 | buck |
| 1 | 0 | S2 bb-buck | 1 | 0 | 1 | boost |
| 1 | 0 | S3 boost | 1 | 1 | 0 | buck |
| 1 | 1 | S0 buck | 0 | 0 | 0 | buck |
| 1 | 1 | S1 bb-boost | 0 | 1 | 0 | buck |
| 1 | 1 | S2 bb-buck | 1 | 0 | 0 | buck |
| 1 | 1 | S3 boost | 1 | 1 | 1 | boost |

FIG. 5

CONTROLLER OF BUCK-BOOST CONVERSION CIRCUIT AND MODE SWITCHING METHOD THEREOF

CROSS-REFERENCE TO RELATED APPLICATION

This application claims the priority benefit of China application serial No. 202310065376.X, filed on Jan. 13, 2023. The entirety of the above-mentioned patent application is hereby incorporated by reference herein and made a part of this specification.

BACKGROUND

Technical Field

The disclosure relates to a controller, and more particularly, to a controller of a buck-boost conversion circuit and a mode switching method thereof.

Description of Related Art

FIG. 1 is a schematic circuit diagram of an output stage circuit of an existing buck-boost conversion circuit. Referring to FIG. 1, the buck-boost conversion circuit enables an output stage circuit 110 to operate in different operation modes according to switch control signals SWB to SWD provided by a controller (not shown) to provide an output voltage VOUT different from an input voltage VIN.

For example, in a buck mode, the output voltage VOUT is required to be less than the input voltage VIN. In this operation mode, switches 111 and 112 are respectively controlled by a switch control signal SWA and the switch control signal SWB to be turned off and turned on through drivers DR1 and DR2. A switch 113 is continuously turned off, and a switch 114 is continuously turned on, so as to provide the output voltage VOUT.

In a boost mode, the output voltage VOUT is required to be greater than the input voltage VIN. In this operation mode, the switch 112 is continuously turned off, and the switch 111 is continuously turned on, so as to provide the input voltage VIN. The switches 113 and 114 are respectively controlled by the switch control signals SWC and SWD to be turned off and turned on through drivers DR3 and DR4. In other words, an operation mode of a buck-boost conversion circuit 100 may be switched by switching the switch control signals SWB to SWD.

Generally speaking, the controller may generate the switch control signals SWA to SWD according to the output voltage VOUT, the input voltage VIN, and a mode switching signal (not shown). The mode switching signal may indicate the operation mode of the buck-boost conversion circuit. However, the mode switching signal is generated by a dedicated circuit in the controller based on a dedicated signal, which increases operational complexity of the buck-boost conversion circuit and increases a circuit area of the buck-boost conversion circuit.

Note here that the content in the section of "Description of Related Art" is used to help understand the present disclosure. Part of the content (or all of the content) disclosed in the section of "Description of Related Art" may not be the conventional technology known to those with ordinary knowledge in the art. The content disclosed in the section of "Description of Related Art" does not mean that the content has been known to those with ordinary knowledge in the art before the application of the present disclosure.

SUMMARY

The embodiment of the disclosure provides a controller of a buck-boost conversion circuit, which may operate with a novel mode switching method and may reduce a circuit area of the buck-boost conversion circuit.

A controller of a buck-boost conversion circuit in the embodiment of the disclosure is configured to control operations of multiple switches of the buck-boost conversion circuit to convert an input voltage into an output voltage and provide an output current. The controller includes a slope compensation circuit, a control loop, and a mode switching circuit. The slope compensation circuit is configured to generate a slope compensation signal according to a mode switching signal of a current cycle. The control loop is coupled to the slope compensation circuit and the switches respectively, and is configured to generate multiple switch control signals according to the slope compensation signal, a feedback voltage related to the output voltage, and a current sense signal related to the output current to control the operations of the switches respectively. The mode switching circuit is coupled to the slope compensation circuit and the control loop. The mode switching circuit is configured to generate the mode switching signal of a next cycle according to the slope compensation signal and at least one of the switch control signals, so as to control an operation mode of the buck-boost conversion circuit.

According to an embodiment of the disclosure, the mode switching circuit includes a selection circuit, a sample circuit, a comparison circuit, and a logic circuit. The selection circuit is configured to provide the at least one of the switch control signals according to the mode switching signal. The sample circuit is coupled to the slope compensation circuit and the selection circuit. The sample circuit is configured to perform a sampling operation on the slope compensation signal according to the at least one of the switch control signals to provide a sample value. The comparison circuit is coupled to the sample circuit. The comparison circuit is configured to compare the sample value with a reference value to generate a comparison result. The logic circuit is coupled to the comparison circuit. The logic circuit is configured to generate the mode switching signal of the next cycle according to the comparison result and the mode switching signal of the current cycle.

According to an embodiment of the disclosure, the logic circuit further generates the mode switching signal of the next cycle according to the mode switching signal of a previous cycle.

According to an embodiment of the disclosure, the logic circuit includes a memory unit and a logic control unit. The memory unit is configured to store a first value, a second value, and the mode switching signal of the current cycle. The first value is the comparison result in a buck mode of a latest cycle, and the second value is the comparison result in a boost mode of the latest cycle. The logic control unit is coupled to the memory unit, and is configured to generate the mode switching signal of the next cycle according to the first value, the second value, and the mode switching signal of the current cycle.

According to an embodiment of the disclosure, the memory unit further stores the mode switching signal of a previous cycle, so that the logic control unit generates the mode switching signal of the next cycle.

According to an embodiment of the disclosure, the reference value is a fixed value independent of the operation mode of the buck-boost conversion circuit.

According to an embodiment of the disclosure, the operation mode of the buck-boost conversion circuit is switched between a buck mode, a boost mode, and a buck-boost mode. A cycle of the buck-boost mode is less than a cycle of the buck mode or the boost mode.

The embodiment of the disclosure further provides a mode switching method of a controller of a buck-boost conversion circuit. The mode switching method is configured to control operations of multiple switches of the buck-boost conversion circuit to convert an input voltage into an output voltage and provide an output current. The mode switching method includes the following. A slope compensation signal is generated according to a mode switching signal of a current cycle. Multiple switch control signals are generated according to the slope compensation signal, a feedback voltage related to the output voltage, and a current sense signal related to the output current to control the operations of the switches respectively. The mode switching signal of a next cycle is generated according to the slope compensation signal and at least one of the switch control signals, so as to control an operation mode of the buck-boost conversion circuit.

According to an embodiment of the disclosure, the mode switching method further includes the following. The at least one of the switch control signals is provided according to the mode switching signal. A sampling operation is performed on the slope compensation signal according to the at least one of the switch control signals to provide a sample value. The sample value is compared with a reference value to generate a comparison result. The mode switching signal of the next cycle is generated according to the comparison result and the mode switching signal of the current cycle.

According to an embodiment of the disclosure, the mode switching method further includes the following. The mode switching signal of the next cycle is generated according to the mode switching signal of a previous cycle.

According to an embodiment of the disclosure, the mode switching method further includes the following. A first value, a second value, and the mode switching signal of the current cycle are stored. The first value is the comparison result in a buck mode of a latest cycle, and the second value is the comparison result in a boost mode of the latest cycle. The mode switching signal of the next cycle is generated according to the first value, the second value, and the mode switching signal of the current cycle.

According to an embodiment of the disclosure, the mode switching method further includes the following. The mode switching signal of a previous cycle is stored to generate the mode switching signal of the next cycle.

According to an embodiment of the disclosure, the mode switching method further includes the following. The reference value is a fixed value independent of the operation mode of the buck-boost conversion circuit.

According to an embodiment of the disclosure, the mode switching method further includes the following. The operation mode of the buck-boost conversion circuit is switched to one of a buck mode, a boost mode, and a buck-boost mode. A cycle of the buck-boost mode is less than a cycle of the buck mode or the boost mode.

Based on the above, in the controller of the buck-boost conversion circuit and the mode switching method thereof according to the embodiment of the disclosure, the mode switching signal is generated according to the existing slope compensation signal and the switch signals in the controller circuit, the controller switches the signal according to this mode in the next cycle to generate the slope compensation signal, and generates the switch control signals accordingly. Therefore, the controller in the embodiment of the disclosure may simplify the mode switching method of the buck-boost conversion circuit, and does not require additional circuits to reduce the circuit area of the buck-boost conversion circuit.

In order for the aforementioned features and advantages of the disclosure to be more comprehensible, embodiments accompanied with drawings are described in detail below.

BRIEF DESCRIPTION OF THE DRAWINGS

FIG. 5 is a schematic diagram of an operation of a logic circuit according to the embodiment of FIG. 3.

DETAILED DESCRIPTION OF DISCLOSED EMBODIMENTS

Figure 1:
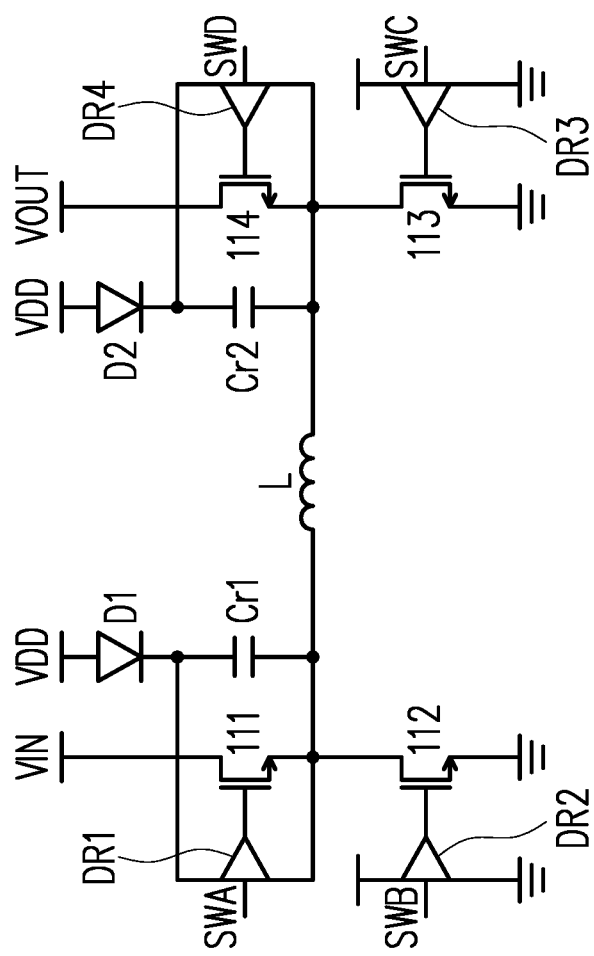
FIG. 1 is a schematic circuit diagram of an output stage circuit of an existing buck-boost conversion circuit.

Reference will now be made in detail to the exemplary embodiments of the disclosure, and examples of the exemplary embodiments are illustrated in the accompanying drawings. Whenever possible, the same reference numerals are used in the drawings and descriptions to indicate the same or similar parts.

Figure 2:
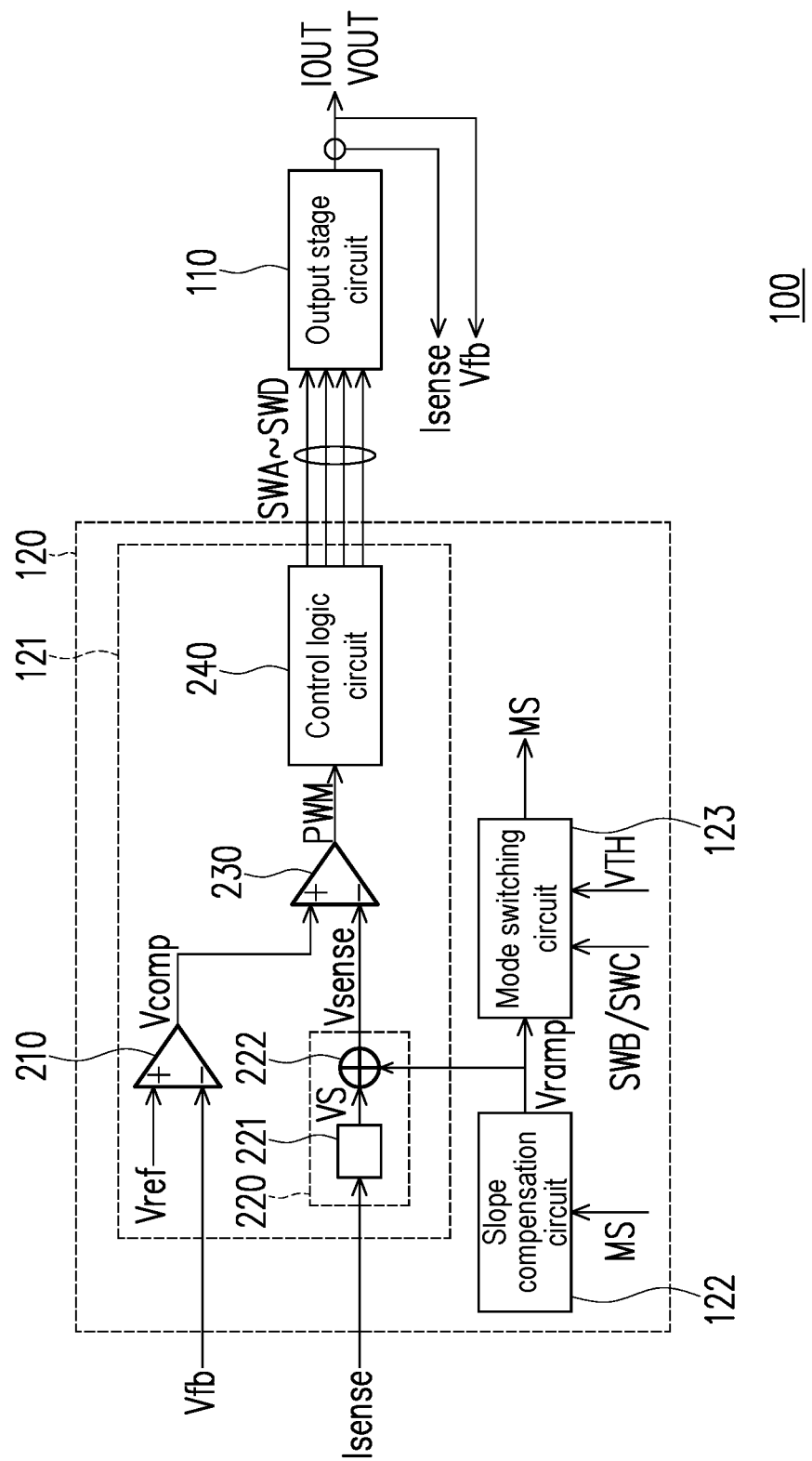
FIG. 2 is a schematic circuit diagram of a controller of a buck-boost conversion circuit according to an embodiment of the disclosure.

FIG. 2 is a schematic circuit diagram of a controller of a buck-boost conversion circuit according to an embodiment of the disclosure. Referring to FIG. 2, the buck-boost conversion circuit 100 may switch between a buck mode, a boost mode, a buck-to-boost mode, and a boost-to-buck mode. The buck-to-boost mode and the boost-to-buck mode may be called a buck-boost mode. In this embodiment, the buck-boost conversion circuit 100 may include the output stage circuit 110 and a controller 120. The output stage circuit 110 may be, for example, the output stage circuit 110 shown in FIG. 1. The controller 120 is coupled to the output stage circuit 110. The controller 120 may control operations of the switches 111 to 114 in the output stage circuit 110 to convert the input voltage VIN into the output voltage VOUT and provide an output current IOUT.

In this embodiment, the controller 120 may include a control loop 121, a slope compensation circuit 122, and a mode switching circuit 123. The control loop 121 is coupled to the slope compensation circuit 122, the mode switching circuit 123, and the output stage circuit 110. In an embodiment, the control loop 121 may generate the switch control signals SWA to SWD according to a feedback voltage Vfb and a feedback current Isense to respectively control the operations of the switches 111 to 114. The feedback voltage Vfb may be, for example, the obtained output voltage VOUT of a current cycle. The feedback current Isense may be, for example, the obtained output current IOUT of the current cycle.

In this embodiment, the slope compensation circuit 122 may receive a mode switching signal MS from the mode switching circuit 123. The slope compensation circuit 122 may generate a slope compensation signal Vramp according to the mode switching signal MS of the current cycle. The mode switching signal MS is configured to indicate the operation mode of the buck-boost conversion circuit 100. Specifically, the slope compensation circuit 122 may further selectively receive the input voltage VIN or the output voltage VOUT. The slope compensation circuit 122 may select the input voltage VIN or the output voltage VOUT according to the mode switching signal MS of the current cycle. The slope compensation circuit 122 may generate the slope compensation signal Vramp according to the selected input voltage VIN or output voltage VOUT.

That is to say, the slope compensation circuit 122 may switch between the input voltage VIN and the output voltage VOUT based on an operation mode of the current cycle to generate the slope compensation signal Vramp according to the input voltage VIN or the output voltage VOUT. For example, in the buck mode, the slope compensation circuit 122 switches a signal at an input end of the slope compensation circuit 122 to the input voltage VIN, and generates the slope compensation signal Vramp accordingly. In the boost mode, the slope compensation circuit 122 switches the signal at the input end of the slope compensation circuit 122 to the output voltage VOUT, and generates the slope compensation signal Vramp accordingly.

Continuing from the above description, the slope compensation circuit 122 may provide the slope compensation signal Vramp to the control loop 121. Therefore, the control loop 121 may generate the switch control signals SWA to SWD according to the feedback voltage Vfb, the feedback current Isense, and the slope compensation signal Vramp to avoid sub-harmonic oscillations when the control loop 121 operates the feedback current Isense.

In this embodiment, the mode switching circuit 123 may receive the slope compensation signal Vramp from the slope compensation circuit 122 and at least one of the switch control signals SWA to SWD (e.g., the switch control signal SWB or SWC) from the control loop 121. The mode switching circuit 123 may generate the mode switching signal MS of a next cycle according to the slope compensation signal Vramp and at least one of the switch control signals SWA to SWD (e.g., the switch control signal SWB or SWC) to control the operation mode of the buck-boost conversion circuit 100.

It is worth mentioning here that the mode switching circuit 123 uses multiple signals of the current cycle (e.g., the slope compensation signal Vramp and the switch control signal SWB) to enable the controller 120 to perform the switch of the operation modes, which may provide the mode switching signal MS of the next cycle in a novel way. Therefore, the mode switching circuit 123 may simplify a control process of a mode switching method. In addition, the mode switching circuit 123 operates by utilizing multiple existing signals in the current buck-boost conversion circuit 100 without the need to dispose other additional circuits, which may reduce a circuit area of the buck-boost conversion circuit 100.

In the embodiment of FIG. 2, the control loop 121 may generate the switch control signals SWA to SWD based on the feedback voltage Vfb generated based on the output voltage VOUT, a current sense signal VS generated based on the output current IOUT, and the slope compensation signal Vramp. In detail, the control loop 121 may include a first circuit 210, a second circuit 220, a third circuit 230, and a control logic circuit 240. The first circuit 210 and the second circuit 220 are respectively coupled to multiple input ends of the third circuit 230. An output end of the third circuit 230 is coupled to the control logic circuit 240. The control logic circuit 240 is coupled to the output stage circuit 110 to provide the switch control signals SWA to SWD to the output stage circuit 110. In this embodiment, the controller 120 may further include a sensing circuit (not shown). The sensing circuit may obtain the output voltage VOUT and the output current IOUT of the current cycle to generate the feedback voltage Vfb and the feedback current Isense respectively. The sensing circuit may feed back the feedback voltage Vfb and the feedback current Isense to the first circuit 210 and the second circuit 220 respectively.

The first circuit 210 may be, for example, an error amplifier. A non-inverting input end of the error amplifier 210 may receive the feedback voltage Vfb. An inverting input end of the error amplifier 210 may receive a reference voltage Vref. The error amplifier 210 may generate a comparison voltage Vcomp according to the feedback voltage Vfb and the reference voltage Vref.

The second circuit 220 may include a current-to-voltage converter 221 and an adder 222. The current-to-voltage converter 221 may receive the feedback current Isense to convert the feedback current Isense into the current sense signal VS. The adder 222 may receive the current sense signal VS and the slope compensation signal Vramp of the current cycle, so as to perform a signal superposition operation on the current sense signal VS and the slope compensation signal Vramp to generate a ramp signal Vsense.

The third circuit 230 may be, for example, a comparator. A non-inverting input end of the comparator 230 may receive the comparison voltage Vcomp. An inverting input end of the comparator 230 may receive the ramp signal Vsense. The comparator 230 may compare the comparison voltage Vcomp with the ramp signal Vsense to generate a modulation signal PWM.

In this embodiment, the control logic circuit 240 may generate the switch control signals SWA to SWD according to the modulation signal PWM. The control logic circuit 240 may be, for example, a signal converter, a field programmable gate array (FPGA), a central processing unit (CPU), other programmable general-purpose or special-purpose microprocessors, a digital signal processor (DSP), a programmable controller, an application specific integrated circuit (ASIC), a programmable logic device (PLD), or other similar devices or a combination of these devices, which may load and execute relevant firmware or software to implement computing and control functions.

Figure 3:
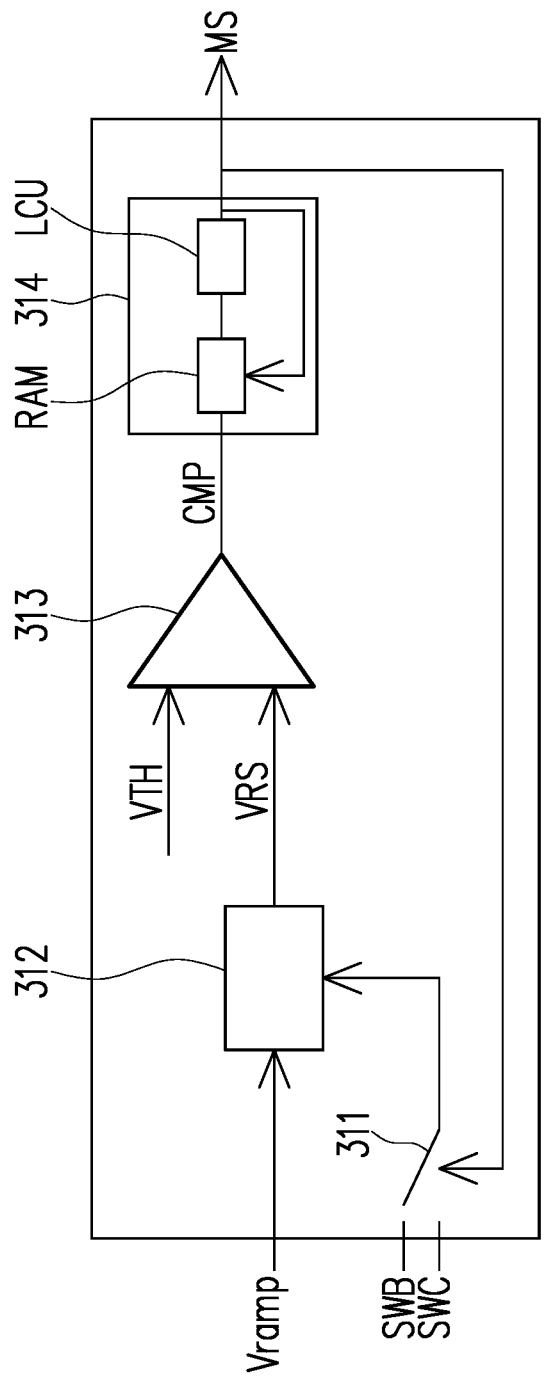
FIG. 3 is a schematic circuit diagram of a mode switching circuit according to an embodiment of FIG. 2 of the disclosure.

FIG. 3 is a schematic circuit diagram of a mode switching circuit according to an embodiment of FIG. 2 of the disclosure. Referring to FIGS. 2 and 3, the mode switching circuit 123 may include a selection circuit 311, a sample circuit 312, a comparison circuit 313, and a logic circuit 314. The selection circuit 311 is coupled to the control logic circuit 240 to receive at least one of SWA to SWD (e.g., the switch control signal SWB and/or SWC). Multiple input ends of the sample circuit 312 are respectively coupled to the selection circuit 311 and the slope compensation circuit 122 to respectively receive the selected switch control signal SWB or SWC and the slope compensation signal Vramp. An output end of the sample circuit 312 is coupled to an input end of the comparison circuit 313. The comparison circuit 313 receives a reference signal VTH. An output end of the comparison circuit 313 is coupled to an input end of the logic circuit 314. An output end of the logic circuit 314 is coupled to the slope compensation circuit 122 and the selection circuit 311 to output the mode switching signal MS of the next cycle.

The selection circuit 311 may switch between two signal lines according to the mode switching signal MS to provide the switch control signal SWB or the switch control signal SWC to the sample circuit 312. The selection circuit 311 may be, for example, a change-over switch or a digital selector. In this embodiment, the sample circuit 312 may be triggered according to a falling edge of the switch control signal SWB or SWC to perform a sampling operation on the slope compensation signal Vramp to provide a sample value VRS. The sample circuit 312 may be, for example, a sample and hold circuit.

The comparison circuit 313 may compare the sample value VRS with a reference value of the reference signal VTH to generate a comparison result CMP. The comparison circuit 313 may be, for example, a comparator. In this embodiment, the logic circuit 314 may generate the mode switching signal MS of the next cycle according to the comparison result CMP and the mode switching signal MS of the current cycle. The logic circuit 314 may provide the mode switching signal MS of the next cycle to the slope compensation circuit 122 and the selection circuit 311, so that the circuits 122 and 311 operate according to the latest mode switching signal MS in the next cycle.

In this embodiment, the logic circuit 314 includes a memory unit RAM and a logic control unit LCU. The memory unit RAM is configured to store the comparison result CMP in the buck mode (referred to as a first value in the following embodiment), the comparison result CMP in the boost mode (referred to as a second value in the following embodiment), and the mode switching signal of the current cycle. The memory unit RAM may be, for example, any type of fixed or removable random access memory (RAM), read-only memory (ROM), flash memory, or similar components or a combination of the above components.

In this embodiment, the logic control unit LCU is coupled to the memory unit RAM. The logic control unit LCU may include multiple logic gates or digital logic circuits to perform operations as shown in FIG. 4 based on, for example, an excitation table in FIG. 5.

Figure 4:
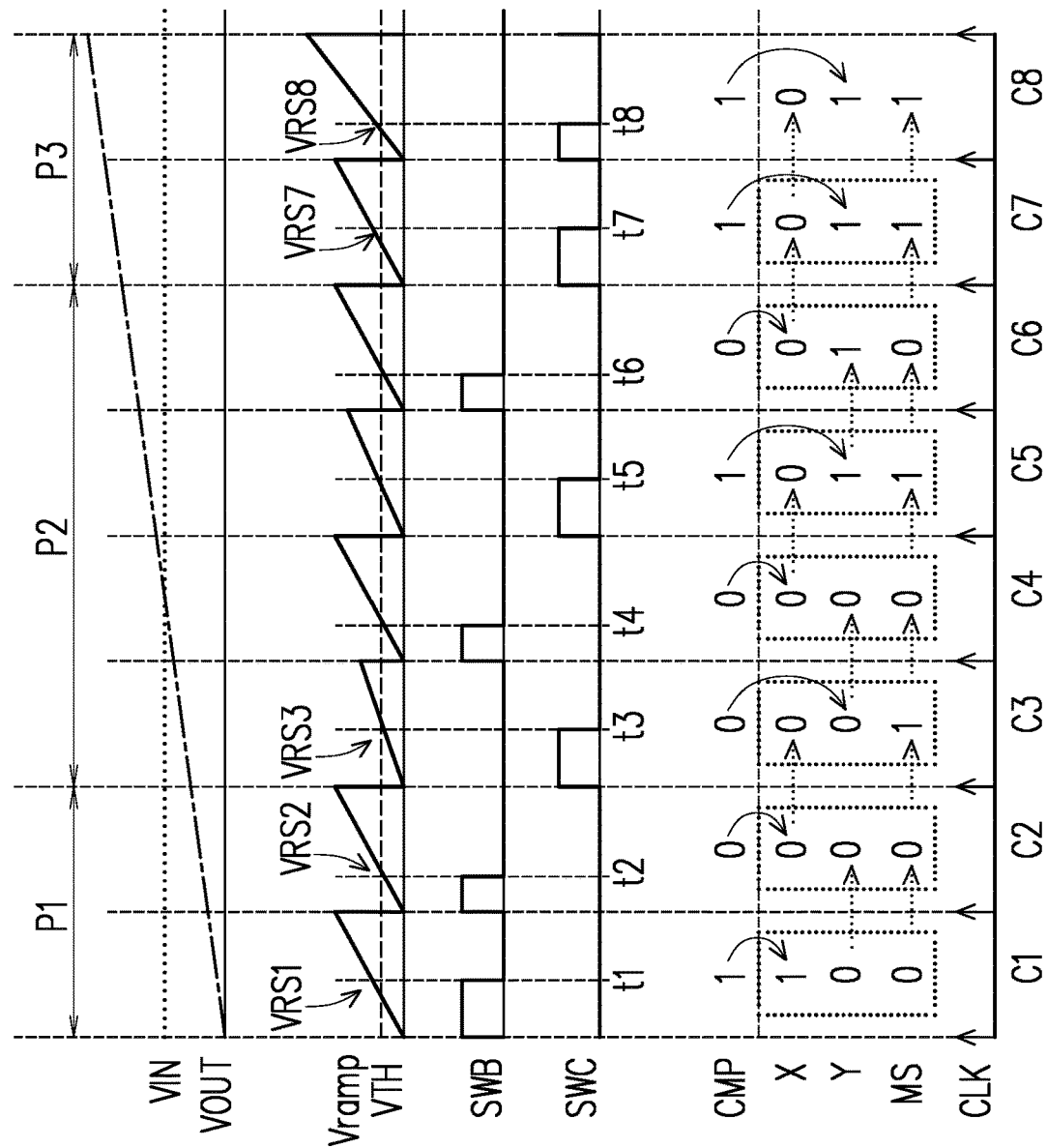
FIG. 4 is a schematic diagram of an operation of the mode switching circuit according to the embodiment of FIG. 3.

FIG. 4 is a schematic diagram of an operation of the mode switching circuit according to the embodiment of FIG. 3. In FIG. 4, an horizontal axis is operation time of the mode switching circuit 123, and a vertical axis is a voltage value or an operation value of the logic control unit LCU. Referring to FIGS. 3 and 4, operation details of the mode switching circuit 123 are described by taking the buck mode as an initial operation mode as an example. In this embodiment, the memory unit RAM further stores the mode switching signal MS of a previous cycle, so that the logic control unit LCU may further consider the mode switching signal MS of the previous cycle to generate the mode switching signal MS of the next cycle according to the comparison result CMP, the mode switching signal MS of the current cycle, and the mode switching signal MS of the previous cycle.

Referring to FIG. 5 together, FIG. 5 is the excitation table according to this embodiment. The excitation table includes multiple fields 510 to 530 and multiple other fields corresponding to the fields 510 to 530. "INPUT" shown in the field 510 may represent an input of the logic control unit LCU (i.e., the comparison result CMP). "Current State" shown in the field 520 may represent an operation mode of a current cycle and a previous cycle of the logic control unit LCU. "Next Output" shown in the field 530 may represent an output of the logic control unit LCU (i.e., the mode switching signal MS of the next cycle).

In detail, "X" shown in a field 511 is the first value stored in the memory unit RAM. The first value X may be the comparison result CMP in the buck mode of a latest cycle (i.e., the latest one). "Y" shown in a field 512 is the second value stored in the memory unit RAM. The second value Y may be the comparison result CMP in the boost mode of the latest cycle (i.e., the latest one).

"State" shown in a field 521 may represent the operation modes of the previous cycle and the current cycle. In this embodiment, the operation modes of the previous cycle and the current cycle may include the buck mode, the boost mode, the buck-boost mode, and the boost-buck mode, and are represented by codes S0 to S3 respectively. For example, the code S0 may indicate that the operation modes of the previous cycle and the current cycle are both the buck mode (i.e., buck). The code S1 may indicate that the operation mode of the previous cycle is the buck mode, and the operation mode of the current cycle is the boost mode (i.e., bb-boost). The code S2 may indicate that the operation mode of the previous cycle is the boost mode, and the operation mode of the current cycle is the buck mode (i.e., bb-buck). The code S3 may indicate that the operation modes of the previous cycle and the current cycle are both the boost modes (i.e., boost).

"Q1" shown in a field 522 may represent a value of the mode switching signal MS of the previous cycle. When the mode switching signal value Q1 is 0, the value of the mode switching signal MS indicating the previous cycle is 0 indicating the buck mode. When the mode switching signal value Q1 is 1, the value of the mode switching signal MS indicating the previous cycle is 1 indicating the boost mode. On the other hand, "Q0" shown in a field 523 may represent the mode switching signal value of the current cycle. When the mode switching signal value Q0 is 0, the value of the mode switching signal MS indicating the current cycle is 0 indicating the buck mode. When the mode switching signal value Q0 is 1, the value of the mode switching signal MS indicating the current cycle is 1 indicating the boost mode.

It should be noted that the mode switching signal MS of the previous cycle and the current cycle may be represented by the mode switching signal values Q1 and Q0 respectively. That is to say, the logic control unit LCU generates the mode switching signal MS of the next cycle according to the first value X, the second value Y, the mode switching signal value Q0 of the current cycle, and the mode switching signal value Q1 of the previous cycle.

The mode switching signal values Q1 and Q0 may also be combined into a set of 2-bit codes (i.e., the codes S0 to S3), which may simplify a circuit design of the logic control unit LCU. That is to say, the mode switching signal MS of the current cycle carries information of the operation mode of the previous cycle. The logic control unit LCU generates the mode switching signal MS of the next cycle according to the first value X, the second value Y, and the mode switching signal value Q0 of the current cycle.

"Cycle" shown in a field 532 may represent the operation mode of the next cycle. "Mode" shown in a field 531 may represent the value of the mode switching signal MS of the next cycle. When the value Mode of the mode switching signal MS is 0, it indicates that the operation mode of the next cycle is the buck mode. When the value Mode of the mode switching signal MS is 1, it indicates that the operation mode of the next cycle is the boost mode.

Referring to FIGS. 3 to 5, the mode switching circuit 123 may operate in multiple consecutive cycles C1 to C8 according to a frequency signal CLK, and switch the operations between the buck mode, the boost mode, the buck-to-boost mode, and the boost-to-buck mode (i.e., the buck-boost mode). In this embodiment, the input voltage VIN may be a constant voltage, for example. The output voltage VOUT may be a voltage signal with a fixed slope, for example.

Specifically, in the cycles C1 to C2 (i.e., a period P1), a voltage value of the output voltage VOUT is less than a voltage value of the input voltage VIN, and the mode switching circuit 123 operates in the buck mode. In the cycles C3 to C5 (i.e., a period P2), the voltage value of the output voltage VOUT is gradually adjusted from a voltage value less than the voltage value of the input voltage VIN to a voltage value greater than the voltage value of the input voltage VIN, and the mode switching circuit 123 sequentially switches between the buck mode and the boost mode (i.e., the buck-boost mode). In the cycles C7 to C8 (i.e., a period P3), the voltage value of the output voltage VOUT is greater than the voltage value of the input voltage VIN, and the mode switching circuit 123 operates in the boost mode.

In this embodiment, each of the cycles C3 to C6 in the period P2 of the buck-boost mode is less than each of the cycles C1 to C2 and C7 to C8 in the period P1 of the buck mode or the period P3 of the boost mode. That is to say, a generation frequency of the frequency signal CLK in the period P2 is greater than a switching frequency of the frequency signal CLK in the period P1 or P3, which may be, for example, twice the frequency, so as to improve accuracy of the output voltage VOUT in the buck-boost mode.

In the initial first cycle C1, the memory unit RAM stores a preset value (i.e., [X, Y]=[0,0]) in a field R_C0 shown in FIG. 5. In the first cycle C1, the operation mode of the current cycle is the buck mode, so the mode switching signal value Q0 of the mode switching signal MS of the current cycle is 0. The mode switching signal MS of the previous cycle (hereinafter referred to as a mode switching signal MS− of the previous cycle) is defaulted to be in the buck mode, so the mode switching signal value Q1 of the mode switching signal MS− of the previous cycle is 0. The switch control signal SWB is a modulation signal (which may be, for example, the modulation signal PWM shown in FIG. 2). The switch control signal SWC is a long-off signal and has a logic low level. In this embodiment, the slope compensation circuit 122 shown in FIG. 2 selects the input voltage VIN based on the buck mode to generate the slope compensation signal Vramp according to the input voltage VIN.

At time t1, a voltage value of the switch control signal SWB is switched from a logic high level to a logic low level, thereby generating the falling edge. The sample circuit 312 is triggered according to the falling edge of the switch control signal SWB. The sample circuit 312 performs the sampling operation on the slope compensation signal Vramp to provide a sample value VRS1, and the comparison circuit 313 compares the sample value VRS1 with the reference value of the reference signal VTH to generate a comparison result of CMP=1. Since the current cycle is in the buck mode, and the sample value VRS1 is greater than the reference value of the reference signal VTH, a value of the comparison result of CMP=1 is stored in the first value X, so that X=1.

Based on the excitation table shown in FIG. 5, the logic control unit LCU substitutes the first value of X=1 of the comparison result CMP into the corresponding value (that is, X=0 is updated to X=1) in the field R_C0. The logic control unit LCU maintains a corresponding second value of Y=0 in the field R_C0. Since the mode switching signal values Q1 and Q0 are 0 and 0 respectively, before an end of the first cycle C1, the memory unit RAM stores multiple corresponding values (i.e., [X, Y, MS−, MS]=[1,0,0,0]) in a row R_C1 shown in FIG. 5.

Based on the excitation table shown in FIG. 5, a value of Mode=0 of the corresponding mode switching signal MS in the row R_C1 output by the logic control unit LCU is used as the mode switching signal MS of the next cycle (hereinafter referred to as a mode switching signal MS+ of the next cycle), so that the operation mode of the next cycle is still the buck mode.

In the second cycle C2, the operation mode of the current cycle is the buck mode, so the mode switching signal value Q0 of the mode switching signal MS of the current cycle is 0. The operation mode of the previous cycle is the buck mode, so the mode switching signal value Q1 of the mode switching signal MS− of the previous cycle (i.e., the first cycle C1) is 0. The switch control signal SWB is the modulation signal and has a shorter pulse width than the first cycle C1. The switch control signal SWB is the long-off signal and has the logic low level. In this embodiment, the slope compensation circuit 122 shown in FIG. 2 selects the input voltage VIN based on the buck mode to generate the slope compensation signal Vramp according to the input voltage VIN.

At time t2, the switch control signal SWB generates the falling edge to trigger the sample circuit 312. The sample circuit 312 performs the sampling operation on the slope compensation signal Vramp to provide a sample value VRS2, and the comparison circuit 313 compares the sample value VRS2 with the reference value of the reference signal VTH to generate the comparison result CMP. In the buck mode, since the sample value VRS2 is less than the reference value of the reference signal VTH, the first value X of the comparison result CMP is 0.

Based on the excitation table shown in FIG. 5, the logic control unit LCU substitutes the first value of X=0 of the comparison result CMP into the corresponding first value (that is, X=1 is updated to X=0) in the row R_C1. The logic control unit LCU maintains the corresponding second value of Y=0 in the row R_C1. Since the mode switching signal values Q1 and Q0 are 0 and 0 respectively, before an end of the second cycle C2, the memory unit RAM stores multiple corresponding values (i.e., [X, Y, MS−, MS]=[0,0,0,0]) in a row R_C2 shown in FIG. 5.

Based on the excitation table shown in FIG. 5, a corresponding mode switching signal value of Mode=1 in the row R_C2 output by the logic control unit LCU is used as the mode switching signal MS+ of the next cycle, so that the operation mode of the next cycle is switched to the boost mode.

In the third cycle C3, the operation mode of the current cycle is the boost mode, so the mode switching signal value Q0 of the mode switching signal MS of the current cycle is 1. The operation mode of the previous cycle is the buck mode, so the mode switching signal value Q1 of the mode switching signal MS− of the previous cycle (i.e., the second cycle C2) is 0. The switch control signal SWB is the long-off signal and has the logic low level. The switch control signal SWC is the modulation signal (which may be, for example, PWM shown in FIG. 2). In this embodiment, the slope compensation circuit 122 shown in FIG. 2 selects the output voltage VOUT based on the boost mode to generate the slope compensation signal Vramp according to the output voltage VOUT.

At time t3, the switch control signal SWC generates the falling edge to trigger the sample circuit 312. The sample circuit 312 performs the sampling operation on the slope compensation signal Vramp to provide a sample value VRS3, and the comparison circuit 313 compares the sample value VRS3 with the reference value of the reference signal VTH to generate the comparison result CMP. In the boost mode, since the sample value VRS3 is less than the reference value of the reference signal VTH, the second value Y of the comparison result CMP is 0.

Based on the excitation table shown in FIG. 5, the logic control unit LCU substitutes the second value of Y=0 of the comparison result CMP into the corresponding value (that is, Y=0 is updated to Y=0) in the row R_C2. The logic control unit LCU maintains the corresponding first value of X=0 in the row R_C2. Since the mode switching signal values Q1 and Q0 are 0 and 1 respectively, before an end of the third cycle C3, the memory unit RAM stores multiple corresponding values (i.e., [X, Y, MS−, MS]=[0,0,0,1]) in a row R_C3 shown in FIG. 5.

Based on the excitation table shown in FIG. 5, the corresponding mode switching signal value Mode (i.e., 0) in the row R_C3 output by the logic control unit LCU is used as the mode switching signal MS+ of the next cycle, so that the operation mode of the next cycle is switched to the buck mode.

In the fourth cycle C4, the operation of the mode switching circuit 123 in the second cycle C2 may be referred for the operation of the mode switching circuit 123 to be derived by analog. In addition, the operations of the mode switching circuit 123 in the third cycle C3 and the second cycle C2 may be referred for the operations of the mode switching circuit 123 in the fifth cycle C5 and the sixth cycle C6 respectively to be derived by analog. Therefore, the same details will not be repeated in the following.

In the seventh cycle C7, the operation mode of the current cycle is the boost mode, so the mode switching signal value Q0 of the mode switching signal MS of the current cycle is 1. The operation mode of the previous cycle is the boost mode, so the mode switching signal value Q1 of the mode switching signal MS− of the previous cycle (i.e., the sixth cycle C6) is 0. The switch control signal SWB is the long-off signal and has the logic low level. The switch control signal SWC is the modulation signal. In this embodiment, the slope compensation circuit 122 shown in FIG. 2 selects the output voltage VOUT based on the boost mode to generate the slope compensation signal Vramp according to the output voltage VOUT.

At time t7, the switch control signal SWC generates the falling edge to trigger the sample circuit 312. The sample circuit 312 performs the sampling operation on the slope compensation signal Vramp to provide a sample value VRS7, and the comparison circuit 313 compares the sample value VRS7 with the reference value of the reference signal VTH to generate the comparison result CMP. In the boost mode, since the sample value VRS7 is greater than the reference value of the reference signal VTH at this time, the second value Y of the comparison result CMP is 1.

Based on the excitation table shown in FIG. 5, the logic control unit LCU substitutes the second value of Y=1 of the comparison result CMP into the corresponding value (that is, Y=1 is updated to Y=1) in a row R_C7. The logic control unit LCU maintains the corresponding first value (i.e., X=0) in the row R_C7. Since the mode switching signal values Q1 and Q0 are 1 and 0 respectively, before an end of the seventh cycle C7, the memory unit RAM stores multiple corresponding values (i.e., [X, Y, MS−, MS]=[0,1,1,0]) in the row R_C7 shown in FIG. 5.

Based on the excitation table shown in FIG. 5, the corresponding mode switching signal value Mode (i.e., 1) in the row R_C7 output by the logic control unit LCU is used as the mode switching signal MS+ of the next cycle, so that the operation mode of the next cycle is switched to the boost mode.

In the eighth cycle C8, the operation mode of the current cycle is the boost mode, so the mode switching signal value Q0 of the mode switching signal MS of the current cycle is 1. The operation mode of the previous cycle is the boost mode, so the mode switching signal value Q1 of the mode switching signal MS− of the previous cycle (i.e., the seventh cycle C7) is 1. The switch control signal SWB is the long-off signal and has the logic low level. The switch control signal SWC is the modulation signal. In this embodiment, the slope compensation circuit 122 shown in FIG. 2 selects the output voltage VOUT based on the boost mode to generate the slope compensation signal Vramp according to the output voltage VOUT.

At time t8, the switch control signal SWC generates the falling edge to trigger the sample circuit 312. The sample circuit 312 performs the sampling operation on the slope compensation signal Vramp to provide a sample value VRS8, and the comparison circuit 313 compares the sample value VRS8 with the reference value of the reference signal VTH to generate the comparison result CMP. In the boost mode, since the sample value VRS8 is greater than the reference value of the reference signal VTH, the second value Y of the comparison result CMP is 1.

Based on the excitation table shown in FIG. 5, the logic control unit LCU substitutes the second value of Y=1 of the comparison result CMP into the corresponding second value (that is, Y=1 is updated to Y=1) in a row R_C8. The logic control unit LCU maintains the corresponding first value (i.e., X=0) in the row R_C8. Since the mode switching signal values Q1 and Q0 are 1 and 1 respectively, before an end of the eighth cycle C8, the memory unit RAM stores multiple corresponding values (i.e., [X, Y, MS−, MS]=[0,1,1,1]) in the row R_C8 shown in FIG. 5.

Based on the excitation table shown in FIG. 5, the corresponding mode switching signal value Mode (i.e., 1) in the row R_C8 output by the logic control unit LCU is used as the mode switching signal MS+ of the next cycle, so that the operation mode of the next cycle is switched to the boost mode.

After the eighth cycle C8, since the voltage value of the output voltage VOUT is continuously greater than the voltage value of the input voltage VIN, an input value of the logic control unit LCU will be the same as the corresponding value (i.e., [X, Y]=[0,1]) in the eighth cycle C8, so that the operation mode is maintained as the boost mode.

It should be noted that the reference value of the reference voltage VTH is a fixed value independent of the operation mode of the buck-boost conversion circuit 100. That is to say, in the buck mode, the boost mode, and the buck-boost mode, the mode switching circuit 123 performs a comparison operation according to the shared reference voltage VTH, so a circuit area of the mode switching circuit 123 may be saved.

Figure 6:
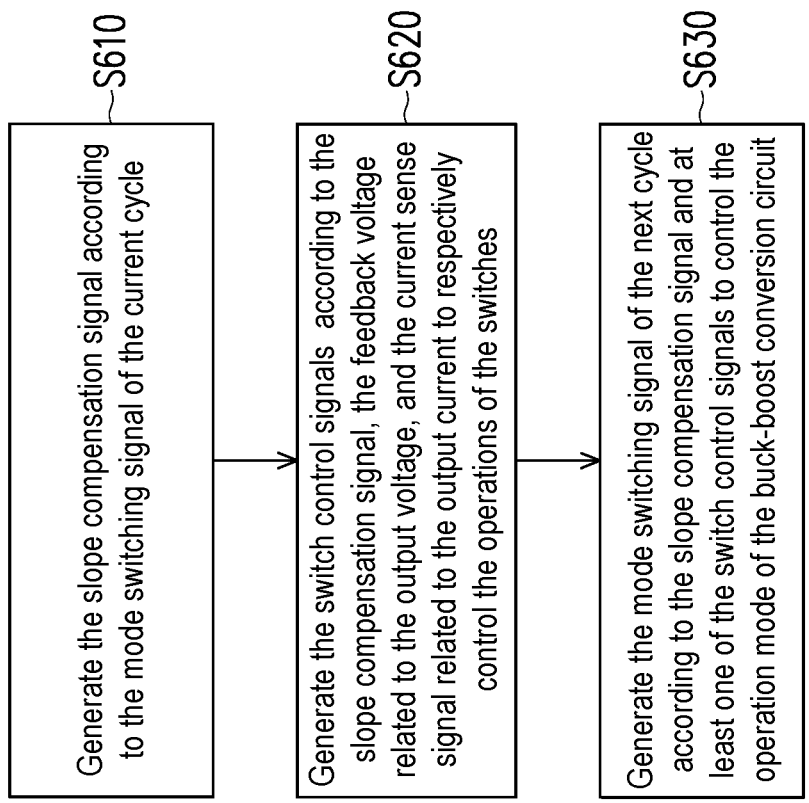
FIG. 6 is a flow chart of a mode switching method of a controller of a buck-boost conversion circuit according to an embodiment of the disclosure.

FIG. 6 is a flow chart of a mode switching method of a controller of a buck-boost conversion circuit according to an embodiment of the disclosure. Referring to FIGS. 1, 2, and 6, the controller 120 may perform the mode switching method to control the operations of the switches 111 to 114 of the buck-boost conversion circuit 100. The controller 120 may perform the following steps S610 to S630 to perform the mode switching method. In step S610, the slope compensation circuit 122 generates the slope compensation signal Vramp according to the mode switching signal MS of the current cycle. In step S620, the switch control signals SWA to SWD are generated through the control loop 121 according to the slope compensation signal Vramp, the feedback voltage Vfb related to the output voltage VOUT, and the current sense signal VS related to the output current IOUT to respectively control the operations of the switches 111 to 114. In step S630, the mode switching circuit 123 generates the mode switching signal MS of the next cycle according to the slope compensation signal Vramp and at least one of the switch control signals SWA to SWD (e.g., the switch control signal SWB and/or SWC), so as to control the operation mode of the buck-boost conversion circuit 100. Implementation details of the above steps S610 to S630 have been described in detail in the foregoing embodiments and multiple implementations. Therefore, the same details will not be repeated in the following.

Based on the above, the controller of the buck-boost conversion circuit and the mode switching method thereof according to the embodiment of the disclosure provide a novel mode switching method, which may operate based on the existing signals in the buck-boost conversion circuit (e.g., the slope compensation signal and the switch control signals). In this way, the controller may simplify the control process of the mode switching method and reduce the circuit area of the buck-boost conversion circuit. In some embodiments, the logic circuit may automatically switch between different operation modes based on the excitation table, and operates according to the fixed reference voltage, thereby saving the circuit area of the mode switching circuit.

Lastly, it is to be noted that: the embodiments described above are only used to illustrate the technical solutions of the disclosure, and not to limit the disclosure; although the disclosure is described in detail with reference to the embodiments, those skilled in the art should understand: it is still possible to modify the technical solutions recorded in the embodiments, or to equivalently replace some or all of the technical features; the modifications or replacements do not cause the essence of the corresponding technical solutions to deviate from the scope of the technical solutions of the embodiments.

What is claimed is:

1. A controller of a buck-boost conversion circuit configured to control operations of a plurality of switches of the buck-boost conversion circuit to convert an input voltage into an output voltage and provide an output current, wherein the controller comprises:
   a slope compensation circuit configured to generate a slope compensation signal according to a mode switching signal of a current cycle;
   a control loop coupled to the slope compensation circuit and the switches respectively and configured to generate a plurality of switch control signals according to the slope compensation signal, a feedback voltage related to the output voltage, and a current sense signal related to the output current to control the operations of the switches respectively; and
   a mode switching circuit coupled to the slope compensation circuit and the control loop and configured to generate the mode switching signal of a next cycle according to the slope compensation signal and at least one of the switch control signals, so as to control an operation mode of the buck-boost conversion circuit,
   wherein the operation mode of the buck-boost conversion circuit is switched between a buck mode, a boost mode, and a buck-boost mode,
   wherein a cycle of the buck-boost mode is less than a cycle of the buck mode or the boost mode.

2. The controller according to claim 1, wherein the mode switching circuit comprises:
   a selection circuit configured to provide the at least one of the switch control signals according to the mode switching signal;
   a sample circuit coupled to the slope compensation circuit and the selection circuit and configured to perform a sampling operation on the slope compensation signal according to the at least one of the switch control signals to provide a sample value;
   a comparison circuit coupled to the sample circuit and configured to compare the sample value with a reference value to generate a comparison result; and
   a logic circuit coupled to the comparison circuit and configured to generate the mode switching signal of the next cycle according to the comparison result and the mode switching signal of the current cycle.

3. The controller according to claim 2, wherein the logic circuit further generates the mode switching signal of the next cycle according to the mode switching signal of a previous cycle.

4. The controller according to claim 2, wherein the logic circuit comprises:
   a memory unit configured to store a first value, a second value, and the mode switching signal of the current cycle, wherein the first value is the comparison result in the buck mode of a latest cycle, and the second value is the comparison result in the boost mode of the latest cycle; and
   a logic control unit coupled to the memory unit and configured to generate the mode switching signal of the next cycle according to the first value, the second value, and the mode switching signal of the current cycle.

5. The controller according to claim 4, wherein the memory unit further stores the mode switching signal of a previous cycle, so that the logic control unit generates the mode switching signal of the next cycle.

6. The controller according to claim 2, wherein the reference value is a fixed value independent of the operation mode of the buck-boost conversion circuit.

7. A mode switching method of a controller of a buck-boost conversion circuit configured to control operations of a plurality of switches of the buck-boost conversion circuit to convert an input voltage into an output voltage and provide an output current, wherein the mode switching method comprises:
   generating a slope compensation signal according to a mode switching signal of a current cycle;
   generating a plurality of switch control signals according to the slope compensation signal, a feedback voltage related to the output voltage, and a current sense signal related to the output current to control the operations of the switches respectively;
   generating the mode switching signal of a next cycle according to the slope compensation signal and at least one of the switch control signals, so as to control an operation mode of the buck-boost conversion circuit; and
   switching the operation mode of the buck-boost conversion circuit to one of a buck mode, a boost mode, and a buck-boost mode, wherein a cycle of the buck-boost mode is less than a cycle of the buck mode or the boost mode.

8. The mode switching method according to claim 7, further comprising:
providing the at least one of the switch control signals according to the mode switching signal;
performing a sampling operation on the slope compensation signal according to the at least one of the switch control signals to provide a sample value;
comparing the sample value with a reference value to generate a comparison result; and
generating the mode switching signal of the next cycle according to the comparison result and the mode switching signal of the current cycle.

9. The mode switching method according to claim 8, further comprising:
generating the mode switching signal of the next cycle according to the mode switching signal of a previous cycle.

10. The mode switching method according to claim 8, further comprising:
storing a first value, a second value, and the mode switching signal of the current cycle, wherein the first value is the comparison result in the buck mode of a latest cycle, and the second value is the comparison result in the boost mode of the latest cycle; and
generating the mode switching signal of the next cycle according to the first value, the second value, and the mode switching signal of the current cycle.

11. The mode switching method according to claim 10, further comprising:
storing the mode switching signal of a previous cycle to generate the mode switching signal of the next cycle.

12. The mode switching method according to claim 8, wherein the reference value is a fixed value independent of the operation mode of the buck-boost conversion circuit.

* * * * *